May 4, 1926.

J. G. ZIMMERMAN

FILM PACK

Filed Dec. 13, 1918

Inventor
James G. Zimmerman
By Brown Hanson & Boettcher
Attorneys

May 4, 1926.　　　　　J. G. ZIMMERMAN　　　　　1,583,381
　　　　　　　　　　　　　FILM PACK
　　　　　　　　Filed Dec. 13, 1918　　　3 Sheets-Sheet 2
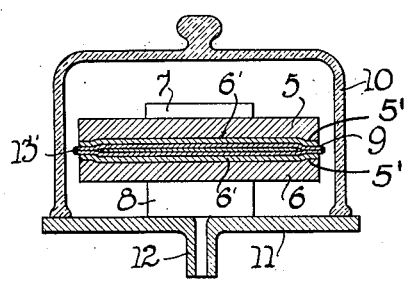
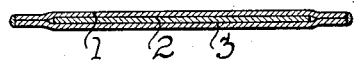
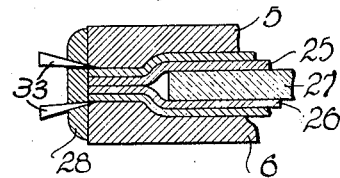
Inventor
James G. Zimmerman
By Brown Hanson & Boettcher
　　　　Attorneys May 4, 1926.
J. G. ZIMMERMAN
1,583,381
FILM PACK
Filed Dec. 13, 1918    3 Sheets-Sheet 3
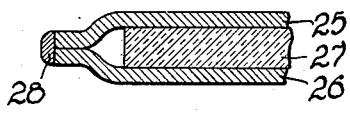
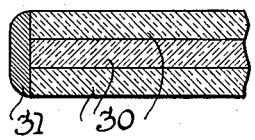
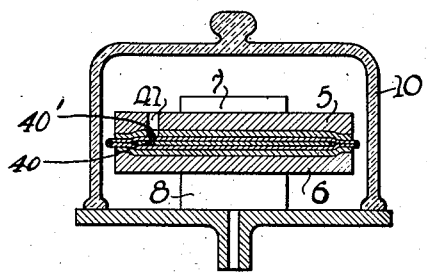
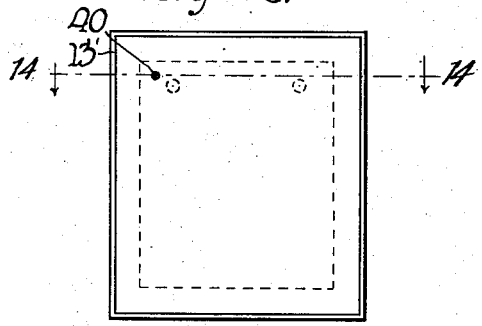
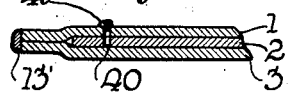
Inventor
James G. Zimmerman
By Brown Hanson Bottene
Attorneys Patented May 4, 1926.

1,583,381

UNITED STATES PATENT OFFICE.

JAMES G. ZIMMERMAN, OF CHICAGO, ILLINOIS.

FILM PACK.

Application filed December 13, 1918. Serial No. 266,537.

*To all whom it may concern:*

Be it known that I, JAMES G. ZIMMERMAN, a citizen of the United States, residing at Chicago, in the county of Cook and State of Illinois, have invented a certain new and useful Improvement in Film Packs, of which the following is a full, clear, concise, and exact description, reference being had to the accompanying drawings, forming a part of this specification.

My invention relates to improvements in photography and has special reference to improved means and methods especially adapted for color photography.

In the recent development of color photography there has been developed a method of simultaneously exposing a set of three plates provided with sensitized films, so progressively arranged that the first film to be affected records only the violet rays, the film being transparent to all other rays. The next film is only affected by the green rays, the remaining rays passing through the film to the third film which is made to be sensitive to all the rays, but the violet and green rays having been eliminated, the third film records only the red-orange rays.

So far as I am informed, glass negatives have been used in this method of color photography, and having been exposed the three negatives are properly developed to retain their several color values. Then prints are made from the three negatives upon suitably dyed transparent print blanks so that when the three prints are properly superposed, the picture is reproduced in its several proper colors.

So far there has not been provided any adequate means for assembling these three records or prints into perfect and exact register, the only means provided being the judgment of the assembler by the eye as to the perfectness of registry.

It is one of my objects to provide a method of and means for producing such color pictures which will eliminate the judgment of the assembler as a factor in the correctness of the registry and cause a perfect superposed registry of the several prints to result automatically.

My improvement includes and makes use of many steps and processes which are not limited in their beneficial results to the production of color pictures. For instance, I provide means for binding several sheet elements into close and intimate surface contact with each other, and in such a manner that even without any peripheral binding the several sheets are maintained in their associated relative positions. By the addition of binding or sealing material impervious to air, the several superposed or contacting sheets are retained indefinitely in their closely contacting positions until such time as they are purposely separated.

My improvement and the methods and means involved in the practice and use of same, as well as the production and use of my improved film pack will be more readily understood by reference to said drawings, in which:

Figure 6 is a sectional view showing the method of exhausting the pack;

Figure 7 is a view similar to Figure 1 showing the finished exhausted and sealed pack;

Figure 8 is a view similar to Figure 7 illustrating the feature that the pack can be bent or curved as a whole without disturbing the relative position of the several films or the surfaces thereof which are adapted to be affected by light;

Figure 9 is a fragmentary view illustrating the method I employ to free the pack from the clamping plates;

Figures 10 and 11 are fragmentary sectional views of modified forms of packs;

Figure 12 is a view similar to Figure 6, showing a slightly modified method of sealing and exhausting the packs;

Figure 13 is a plan view of the pack, similar to Figure 4, particularly illustrating the vent hole which I provide in the pack for exhausting same; and Figure 14 is an enlarged fragmentary section of the pack on the line 14—14 of Figure 13.

Figure 1:
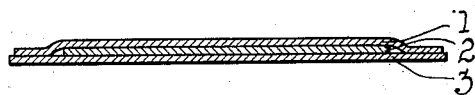
Figure 1 is a cross sectional view of a preferred form of my improved film pack in process of manufacture.
Figure 2:
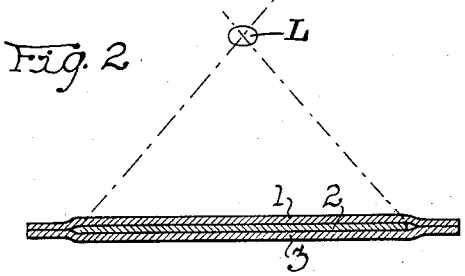
Figure 2 is a similar view of the pack and particularly illustrating or indicating the arrangement of the several sheets thereof in reference to the exposure to light.
Figure 3:
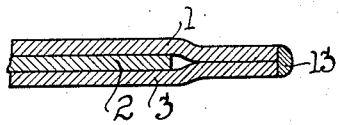
Figure 3 is a fragmentary view similar to Figure 1, particularly illustrating the edge seal.
Figure 4:
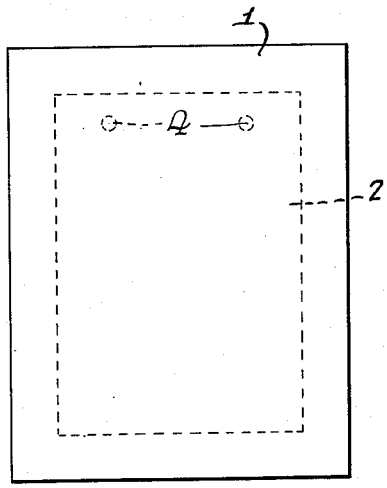
Figure 4 is a plan view of the sheets as they are being assembled to form the pack.
Figure 5:
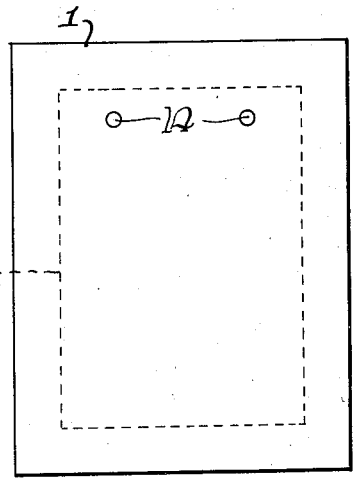
Figure 5 is a plan view of the pack as punched but not trimmed.

In making or building up my improved pack of films for use in color photography I arrange or prepare three sheets 1, 2 and 3, in Figure 1, of suitable size, preferably the two outer sheets 1 and 3 of the same size and the inner sheet of smaller size as shown. I prepare these sheets with sensitized surfaces in accordance with the well known Hess Ives process, sheet 1 being adapted to make a record of the violet rays, sheet 2 of the green rays and sheet 3 of the red-orange rays. I arrange these sheets as best shown in Figure 4 with the margin of the middle or smaller sheet 2 within the margins of the other sheets. It should be noted that the thickness of the several sheets in the several views is very greatly exaggerated, as I use very thin sheet celluloid such as is ordinarily known as "film", as the base upon which I prepare the sensitized surfaces.

In Figure 4 the two dotted circles 4 indicate the position that the registering holes will occupy when they are later produced.

Having arranged the sheets as shown in Figure 1, the several sensitized surfaces being properly superposed, I next clamp the several sheets firmly together between the rigid die plates 5 and 6, Figure 6, by means of suitable clamping members 7 and 8. The plates 5 and 6 are preferably the same shape as the sheets but a trifle smaller in dimensions so that the edges 9 of the pack are exposed all around.

I make the inner surfaces of the clamping plates 5 and 6 with their inner portions sunken substantially half the thickness of the center smaller sheet 2 and conformed in shape and area therewith. In other words I make these plates with edge portions 5' which together substantially equal in depth the thickness of the middle sheet, joining the rim portion in each instance with the bottom of the middle sunken portion with an easy ogee curve so as to present smooth surfaces to the pack, best fitted to press the outer edges of the outer sheets into close contact and around the outer edge of the middle sheet without unduly straining the sheets at any point.

This construction produces a pack which has a margin portion thinner than the body of the pack. This form of pack has an important advantage over one which is of even thickness throughout, in that space is provided to permit a slight thickening of the extreme outer edge of the pack without interfering with the proper exposure of the pack. In other words, I allow sufficient leeway so that any slight variation in the thickness of the sealing material will not extend beyond the flat surfaces of the pack where it would interfere with or prevent successful exposure of the pack.

To prevent the plates 5 and 6 injuring the sheets of which the pack is formed, I interpose a sheet 6' of soft material such as felt between the pack and the plates 5 and 6. These pads or packing prevent localized excessive pressure on the pack and protect the outer surfaces of the outer sheets against being rubbed or scratched or otherwise disturbed by the plates 5 and 6 when the pack is clamped between the plates in the process of manufacture. After properly clamping the pack I then place it in clamped condition beneath a vacuum bell 10 upon a base plate 11. The plate has an outlet nozzle 12 which is adapted to be connected to a vacuum pump for exhausting the bell 10. Having placed the clamped pack beneath the bell, my next step is to exhaust the air from the bell, thus placing the pack in a vacuum which draws the air out of the pack thru the exposed edges thereof. I continue this step for sufficient time to completely exhaust the air from between the several sheets. When the pack is thus exhausted of its entrapped air and is then exposed to the atmosphere, the pressure of the atmosphere upon the opposite surfaces of the outer sheets will press the sheets into firm and solid surface contact.

The plurality of sheets of the pack are sealed together at their edges by a strip of sealing material 13' extended around the open perimeters of the sheets. This sealing material may be applied to the edges of the sheet before subjecting the pack to the vacuum within the vacuum bell. According to this method the sealing material is preferably in the form of a soft and somewhat viscous material, which dries slowly and which allows the air and moisture to be drawn out from between the sheets under the action of the vacuum. This sealing material is allowed to dry sufficiently in the vacuum bell to prevent the re-entrance of air into the pack, and when completely dried this sealing material is equivalent to a hermetic seal extending around the edges of the pack. An alternative method of sealing the edges of the pack is to first subject the pack to the action of the vacuum, and to thereafter apply the sealing material around the open edges of the pack while the pack is still retained in the vacuum bell under the action of the vacuum.

As an alternative method of procedure in the production of my improved pack, I may assemble the several sheets into their desired superposed relation and apply the sealing material to the edges of the pack and allow the seal to harden before I subject the pack to the vacuum. This modified method is particularly illustrated in Figures 12, 13, and 14. In this method I preferably arrange the several sheets of the pack as shown in Figure 4, that is in proper superposed contacting relation and clamp the pack thus formed between the clamping plates 5 and 6. I then apply the sealing material 13' to the edges of the pack and allow the same to harden while the pack is thus clamped tightly between the plates 5 and 6. Before clamping the pack between the plates I provide a vent opening 40 extending through the top and middle sheets and thus communicating with the spaces between the middle sheet and the top and bottom sheets, and I provide a hole 41 extending through the top plate 5 and the packing sheet 6' and registering with the vent hole which I have prepared in the pack. Preferably I make this vent hole or puncture near one end or near one corner as shown in Figure 13, so as not to destroy the utility of the several sheets of which the pack is composed. Each of the sheets may be provided with one or more perforations such as the two indicated by dotted lines in Fig. 13, so as to facilitate the assembly of a plurality of said sheets in a pile up arrangement.

Having thus prepared the pack and clamped it between the plates and sealed the edges of the pack, I then proceed, as hereinbefore described, to place the pack within the vacuum chamber and exhaust the chamber, thus subjecting the pack to the vacuum and exhausting all air and moisture from the pack through the vent hole. As in the former instance before I admit the air to the vacuum again I seal the pack against the entrance of air. The seal is preferably perfected by placing a drop of sealing material 40' over the vent opening 40 in the pack. According to one method of sealing, the pack may be first entirely exhausted through the vent opening 40, and the drop of sealing material placed over this vent opening by automatic mechanism, while the pack is still retained in the vacuum bell. A secondary method is to place a drop of the liquid sealing material on the pack over the vent hole before I place the pack in the vacuum, and it is obvious that when the pack is subjected to the vacuum the air will be exhausted from the pack through the vent hole 40 and will escape readily through the sealing material while it is in liquid form. After the pack has thus been exhausted and sealed, I remove it from the vacuum chamber and as soon as the sealing material on the vent has sufficiently dried, the pack is ready for use.

In Figure 10 I have illustrated a slight modification of the pack. Instead of using three flexible sheets as in the preferred form, I may make the two outer sheets 25 and 26 of the celluloid film and the middle element 27 of glass or other transparent material. Then I exhaust the air from between the several sheets as in the first instance and seal the periphery 28 of the outer sheets together.

In exhausting and sealing the pack consisting of the sheets 25, 26 and 27, or of the three flexible sheets 1, 2 and 3, according to the method of exhausting and sealing the same illustrated in Figure 6, there is the possibility of the sealing material 28 extending over the edges of the clamping plates 5 and 6, as illustrated in Figure 9. This sealing material can be readily severed to free the pack from the clamping plates by passing any suitable sharp instruments 33 through the sealing material, as illustrated.

In Figure 11 I have illustrated a pack made up entirely of glass negatives 30, having their edges sealed together by the sealing material 31, thus showing that my method of making a pack for such use is not limited to the use of flexible sheets, but may also be applied advantageously to other materials.

I contemplate producing the registering holes in the several sheets, preferably parallel with the adjacent edges of the respective sheets, and at certain predetermined distances therefrom, so that certain prearranged or located lines or areas on the several sheets, which bear certain definite relations to said edges, shall accurately register with each other in the several steps of certain photo-color processes. One such process is disclosed in my co-pending application, Serial Number 266,536, filed Dec. 13, 1918.

My improved method of holding the pack of thin sheets in close surface contact may advantageously be applied to the manufacture of many articles other than the photographic pack. For instance, I have found it of great benefit in the manufacture of electrical condensers and similar devices which consist of a number of thin flexible or non-flexible sheets arranged in close surface contact.

In view of the above it should be understood that my improved method of making film packs for color photography is not limited to such specific employment and furthermore I do not limit or confine my structural improvements to the specific features herein shown and described.

I claim:

1. The hereindescribed method of building a plurality of sheets into a unitary structure, which consists in arranging the sheets in suitable superposed contacting relation, then removing the air from between the sheets, and then sealing the sheets whereby the several sheets are held pressed together by atmospheric pressure in separable non-adhesive relationship.

2. The hereindescribed method of building a unitary structure out of a plurality of pieces of sheet material which consists in arranging the sheets in suitable superposed contacting relation, removing the air from between the sheets, whereby the several sheets are held pressed together by atmospheric pressure, and sealing the edges of the unitary structure thus produced to prevent the entrance of air between the sheets but maintaining the body portions of the sheets separable.

3. The herein described method of building a plurality of flexible sheets into a unitary structure, which consists in arranging the sheets in suitable superposed contacting relation, then removing the air from between the said sheets and sealing the sheets whereby they are held pressed together by atmospheric pressure without surface adhesion between the body portions of the sheets.

4. The hereindescribed method of building a plurality of flexible sheets into a unitary structure, which consists in arranging the sheets in suitable superposed contacting relation with the edges of at least the two outer sheets substantially coincident, then removing the air from between the several sheets, whereby the several sheets are held pressed together by atmospheric pressure, then sealing the edges only of the structure to prevent entrance of air between the sheets.

5. The hereindescribed method of building a unitary structure out of a plurality of sheets, one sheet at least thereof being flexible, which consists in arranging the sheets in suitable superposed contacting relation bringing the edges of the two outer sheets into contacting relation over the edges of an intermediate sheet or sheets, then exhausting the air from between the sheets, whereby the several sheets are held pressed together by atmospheric pressure.

6. The hereindescribed method of building a plurality of sheets into a unitary structure, one sheet at least thereof being flexible, which consists in arranging the sheets in suitable superposed contacting relation, exhausting the air from between the sheets, whereby the several sheets are held pressed together by atmospheric pressure, and sealing the edges only of said unitary structure with a suitable sealing material to prevent the entrance of air between the several sheets.

7. The hereindescribed method of building a plurality of flexible sheets into a unitary structure, which consists in arranging the several sheets in suitable superposed contacting relation, thus forming a pile, mechanically pressing the sheets into close surface contact by means of pressure plates arranged upon opposite sides of the pile, the periphery or outer edge of the pile being exposed, subjecting the compressed pile to the action of a vacuum prior or subsequently to the application of said mechanical pressure, thereby exhausting the air from between the several sheets, then releasing said pile from the vacuum and from said pressure plates, whereby the several sheets are held in close firm surface contact by atmospheric pressure.

8. The hereindescribed method of building a plurality of flexible sheets into a unitary structure, which consists in arranging the sheets in suitable superposed contacting relation forcing the sheets into firm surface contact by pressure applied to the outer sheets of the structure, subjecting the structure to the action of a vacuum to exhaust the air from between the sheets, and sealing the edges while the structure is still subject to the vacuum to prevent the entrance of air between the sheets.

9. The herein described method of making a film pack which comprises subjecting the several sheets of the pack to the action of a vacuum for removing the air and moisture from said sheets, and sealing the edges of said sheets in assembled relation to prevent the entrance of air and moisture to the contacting surfaces of said sheets, said sheets being separable upon the removal of said seal at the edges thereof.

10. The method of building a plurality of sheets into a unitary structure, which comprises arranging the several sheets in suitable superposed contacting relation, thus forming a pile, excreting the air from between the several sheets by pressing the sheets into close surface contact and subjecting the compressed pile to the action of a vacuum, and then releasing said pile from the vacuum and from said pressure, whereby the several sheets are held in close non-adhesive surface contact by atmospheric pressure.

11. The method of building a plurality of sheets into a unitary structure, which comprises arranging the sheets in suitable superposed contacting relation, excreting the air from between the sheets by subjecting the sheets to a mechanical pressure and to the action of a vacuum, and sealing the edges of the sheets while the structure is still subject to the vacuum to prevent the entrance of air between the sheets.

12. The herein described method of holding a plurality of sheets in definite relationship, which comprises arranging the sheets in superposed order, exhausting the air from between said sheets by subjection to a vacuum, and maintaining the condition of exhaustion between said sheets after the subjection of said sheets to said vacuum has been discontinued, without surface adhesion between the main body portions of said sheets.

13. The herein described method of holding a plurality of sheets in definite relationship which comprises superposing the sheets, the margins of one of the outer sheets extending beyond the margins of an intermediate sheet, folding the extending margins of said outer sheet over the margins of said intermediate sheet, exhausting the air from between said sheets, and then sealing the folded margin of said one outer sheet to the other outer sheet.

In witness whereof I hereunto subscribe my name this 31 day of October, 1918.

JAMES G. ZIMMERMAN.